United States Patent
Xiang et al.

(10) Patent No.: US 9,499,746 B2
(45) Date of Patent: Nov. 22, 2016

(54) ALIGNMENT AND FLATTENING MATERIAL COMPOSITIONS, DISPLAY DEVICE COMPRISING SAME AND PROCESS FOR ADJUSTING DISPLAY COLOR

(71) Applicants: BOE TECHNOLOGY GROUP CO., LTD., Beijing (CN);
(Continued)

(72) Inventors: Xi Xiang, Beijing (CN); Junhwan Lim, Beijing (CN); Bo Shi, Beijing (CN)

(73) Assignees: BOE TECHNOLOGY GROUP CO., LTD., Beijing (CN);
(Continued)

( * ) Notice: Subject to any disclaimer, the term of this patent is extended or adjusted under 35 U.S.C. 154(b) by 89 days.

(21) Appl. No.: 14/355,440

(22) PCT Filed: Dec. 17, 2013

(86) PCT No.: PCT/CN2013/089733
§ 371 (c)(1),
(2) Date: Apr. 30, 2014

(87) PCT Pub. No.: WO2014/190735
PCT Pub. Date: Dec. 4, 2014

(65) Prior Publication Data
US 2015/0291882 A1  Oct. 15, 2015

(30) Foreign Application Priority Data
May 31, 2013 (CN) .......................... 2013 1 0215626

(51) Int. Cl.
*C09K 19/56* (2006.01)
*C08L 79/08* (2006.01)
(Continued)

(52) U.S. Cl.
CPC ................. *C09K 19/56* (2013.01); *C08K 5/06* (2013.01); *C08K 5/3417* (2013.01);
(Continued)

(58) Field of Classification Search
CPC .................................. C08L 79/08; C08K 19/56
See application file for complete search history.

(56) References Cited

U.S. PATENT DOCUMENTS

2004/0209008 A1* 10/2004 Liang ..................... C08G 77/38
428/1.51
2008/0036946 A1*  2/2008 Ono ...................... C08F 220/30
349/96
(Continued)

FOREIGN PATENT DOCUMENTS

CN        1206308        6/2005
CN        1743332 A      3/2006
(Continued)

OTHER PUBLICATIONS

Xing-Hai (Study on synthesis, characterization and photochromic properties of two substituted aromatic Schiff base. Applied Chemical Industry. 39(2), 2010, pp. 251-253; 257).*
(Continued)

*Primary Examiner* — Brieann R Fink
(74) *Attorney, Agent, or Firm* — Ladas & Parry LLP

(57) ABSTRACT

An alignment material composition, a flattening material composition, a liquid crystal display device and a process for adjusting the display color of the liquid crystal display device. The alignment material composition or the flattening material composition each includes 0.5-20 wt % of an organic additive, which is one or more of spiropyran compounds, Schiff base compounds, and heterocyclic diarylethene compounds. By way of adding the aforesaid organic additive in the orientation layer or the flat layer of the liquid
(Continued)

crystal display device, the display color is allowed to be adjusted in a broad color range without affecting other display performances of the liquid crystal display device.

5 Claims, 3 Drawing Sheets

(71) Applicants: CHENGDU BOE OPTOELECTRONICS TECHNOLOGY CO., LTD., Chengdu, Sichuan Province (CN)

(73) Assignees: CHENGDU BOE OPTOELECTRONICS TECHNOLOGY CO., LTD., Chengdu, Sichuan Province (CN)

(51) Int. Cl.
*G02F 1/1337* (2006.01)
*C08K 5/06* (2006.01)
*C08K 5/3417* (2006.01)

(52) U.S. Cl.
CPC ... *G02F 1/133723* (2013.01); *G02F 1/133784* (2013.01); *G02F 1/133788* (2013.01)

(56) References Cited

U.S. PATENT DOCUMENTS

| | | | |
|---|---|---|---|
| 2009/0290109 A1* | 11/2009 | Lee | C09K 19/3048 349/123 |
| 2012/0224244 A1 | 9/2012 | Park et al. | |

FOREIGN PATENT DOCUMENTS

| | | |
|---|---|---|
| CN | 100410758 A | 8/2008 |
| CN | 102750062 A | 10/2012 |
| CN | 102841716 A | 12/2012 |
| CN | 102629030 A | 8/2013 |
| JP | 2006-323152 A | 11/2006 |
| JP | 2012-163677 A | 8/2012 |

OTHER PUBLICATIONS

English translation of Xing-Hai (Study on synthesis, characterization and photochromic properties of two substituted aromatic Schiff base. Applied Chemical Industry. 39(2), 2010, pp. 251-253; 257), 13 pages.*
Written Opinion of the International Searching Authority dated Dec. 12, 2013; PCT/CN2013/077088.
International Search Report mailed Mar. 27, 2014; PCT/CN2013/089733.
Written Opinion of the International Searching Authority dated Mar. 17, 2014; PCT/CN2013/089733.
First Chinese Office Action Appln. No. 201310215626.X; Dated Jun. 30, 2015.

* cited by examiner

ALIGNMENT AND FLATTENING MATERIAL COMPOSITIONS, DISPLAY DEVICE COMPRISING SAME AND PROCESS FOR ADJUSTING DISPLAY COLOR

FIELD OF INVENTION

The embodiment of the invention relates to an alignment material composition, a flattening material composition, a liquid crystal display device comprising the compositions and a process of adjusting the display color of the liquid crystal display device.

BACKGROUND OF INVENTION

The liquid crystal display (LCD) has already become the main flat panel display product due to its advantages such as small size, low energy consumption, no radiation, and the like. The crystal display device is an important component of the liquid crystal display, which comprises a colored film substrate, an array substrate, and a liquid crystal layer positioned between the two substrates. Currently, most liquid crystal displays use a light emitting diode (LED) as the backlight source. However, the white light provided by LED is not perfect usually, in which the intensities of the red light and the green light are higher than the blue light, and thus the finally produced liquid crystal module set (comprising the liquid crystal display device and the backlight module) emits yellowish white light. In order to meet the requirements of the customers on colors, the display color of the liquid crystal display device needs to be adjusted.

Currently, there are primarily two ways useful for adjusting the color of the liquid crystal display device. First, the design of the crystal display device may be changed primarily by two methods: (1) During the process for manufacturing the colored film substrate, the thickness of the three photoresists of red, green, and blue color is adjusted, or the pigment components of the aforesaid three colors are further adjusted so as to change the display color. However, changing the thickness of the three photoresists of red, green, and blue color may cause unsatisfactory color gamut as required by the customer. Moreover, it is relatively complicated to adjust the pigment components of the three colors, and thus is less operable for the liquid crystal display device manufacturers. (2) The box thickness of the liquid crystal display device may be changed. However, although changing the box thickness of the liquid crystal display device may achieve the purpose of adjusting the display color, such operation to an already designed product may cause some optical performances such as transmissivity, response time, visual angle, and the like which do not meet the requirements of the customers. Second, the design of the LED backlight source may be changed primarily by adjusting the color block of the LED lamp, or by further adjusting the ratio of the fluorescent substances in LED, so as to meet the requirements. However, the range of the color adjustable by this method is usually narrow.

Moreover, CN100410758C discloses that a color conversion layer may be placed above the liquid crystal display device or the polarized light film, to adjust the color coordinate of the liquid crystal display. The color conversion layer comprises an evenly distributed filter material (CuPc), which is attached to the color conversion layer by way of evaporation coating. This color conversion layer has a higher transmissivity to blue light as compared to red light and green light. Its thickness and the color coordinate of the white light are linearly correlated. By adjusting the thickness of CuPc, the yellowish white light can be rectified. However, this method requires one more evaporation coating process after the completion of the manufacture of the liquid crystal display device. Moreover, the film manufactured by an evaporation coating method is thick in the center and thin in peripheries. Moreover, the film layer is prone to peeling off due to its weak adhesion to the substrate. These finally cause the liquid crystal display device thus produced to have uneven color.

Accordingly, the embodiment of the invention, by incorporating an organic additive that can display color under UV light radiation into the alignment layer or the flat layer of the liquid crystal display device, provides a method for adjusting the display color of the liquid crystal display device in a broad range of color without affecting other display performances of the liquid crystal display device. Moreover, this method is also applicable to the adjustment of various color deviations of the liquid crystal display device.

SUMMARY OF INVENTION

According to one aspect of the present disclosure, there provides an alignment material composition comprising 60-65 wt % of a solvent; 10-30 wt % of butylcellosolve; 0.5-20 wt % of an organic additive; and 5-10 wt % of a polyimide resin.

According to another aspect of the present disclosure, there provides a flattening material composition comprising 60-75 wt % of a solvent; 10-15 wt % of an adhesive; 10-15 wt % of a reactive monomer; and 0.5-20 wt % of an organic additive.

The organic additive may be one or more of spiropyran compounds, Schiff base compounds, and heterocyclic diarylethene compounds.

The spiropyran compounds are represented by the following Formula 1:

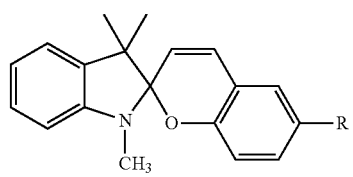

Formula 1 wherein R is hydrogen, halogen, nitro, or $C_{1-4}$ alkoxy.

The Schiff base compounds are complexes of Schiff bases derived from condensation of salicylaldehycle and aniline and represented by the following Formula 3 with $Cu^+$:

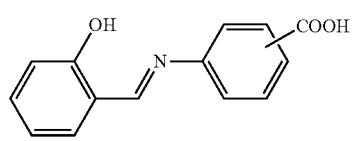

Formula 3 wherein the carboxylic group is at the ortho or para position of the C—N bond.

The heterocyclic diarylethene compounds are represented by the following Formula 2:

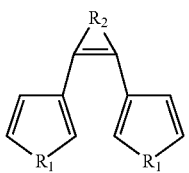

Formula 2

Wherein, $R_1$ is N, O, or S; and $R_2$, together with the double bond to which it attaches, forms a perfluorocyclopentene ring, a cyclopentene ring, a dihydrothiophene ring, a maleic anhydride ring, or a pyrroline ring.

According to another aspect of the present disclosure, there provides a process for adjusting the display color of the liquid crystal display device, comprising forming an alignment layer between the array substrate and the colored film substrate of the liquid crystal display device using the aforesaid alignment material composition; or forming a flat layer above the colored film substrate using the aforesaid flattening material composition.

The process for adjusting the display color of the liquid crystal display device further comprises UV irradiating the alignment layer or the flat layer, to allow the organic additive to display color.

According to another aspect of the present disclosure, there provides a liquid crystal display device comprising an alignment layer formed from the alignment material composition or a flat layer formed from the flattening material composition.

DETAILED DESCRIPTION OF INVENTION

Figure 1:
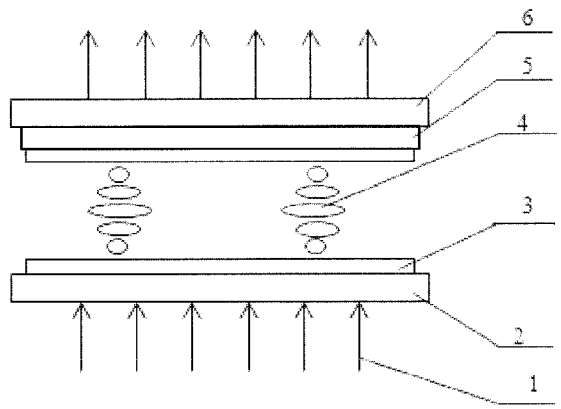
FIG. 1 is a structural diagram of a liquid crystal display device in the prior art exhibiting a yellowish or bluish display color.

In the alignment layer/flattening material composition provided by the present disclosure, an organic additive is incorporated which is sensitive to UV light and can emit light with different colors upon UV light radiation. Therefore, the display color of the liquid crystal display device can be adjusted by forming the corresponding alignment layer and flat layer using the aforesaid alignment layer/flattening material composition. By way of the aforesaid method, the range of adjustable color can be broadened, without affecting the original display performance of the liquid crystal display device.

The present disclosure provides an alignment material composition, comprising 60-65 wt % of a solvent; 10-30 wt % of butylcellosolve; 0.5-20 wt % of an organic additive; and 5-10 wt % of a polyimide resin.

The solvent used in the alignment material composition of the present disclosure is usually a high boiling point organic solvent, which may, for example, be one or more of N-methyl-2-pyrrolindone, γ-butyrolactone, and dipropylene glycol mono-methyl ether. The solvent may be in an amount of 60-65 wt %, based on the total weight of the alignment material composition.

There is no particular limitation to the aforesaid polyimide resin, which may be a common polyimide resin used in the art.

The aforesaid organic additive may be any organic compound which can undergo a chemical reaction under UV radiation of a proper wavelength and generate a colored organic compound. The aforesaid proper wavelength may include any wavelength within the range of UV wavelength. The aforesaid chemical reaction may include a polymerization reaction, isomerization reaction, and the like. The aforesaid color may include colors of visible light such as red, green, blue, yellow, and the like.

Specifically, the aforesaid organic additive is an unsaturated compound with many double bonds in its molecule, or may be a mixture of one or several of such a compound. The organic additive itself has a maximal absorption wavelength in the UV wavelength range. However, under UV radiation at certain wavelengths (usually 254 nm, 313 nm, 365 nm), the organic additive will absorb the energy of the photon of such wavelengths and cause a photochemical reaction, to generate a product with a large conjugated double bond system. The resulting product has a maximal absorption wavelength in the visible light region so that it can display color. In a conjugated double bond system, the longer the conjugated double bond, the larger the conjugated system which leads to a larger maximal absorption wavelength. Moreover, introducing polar groups at both ends of the conjugated system may also cause the absorption wavelength to shift towards longwave. The absorption intensity of the product changes as the changes of radiation intensity and duration. That is to say, the color exhibited can be controlled via the radiation intensity and duration to achieve an effect of adjustment of display color.

The aforesaid organic additive may, for example, be one or more of spiropyran compounds, Schiff base compounds, and heterocyclic diarylethene compounds. Under UV radiation, the spiropyran compounds undergo a bond heterolytic reaction, the Schiff base compounds undergo a cis-trans isomerization reaction, and the heterocyclic diarylethene compounds undergo a pericyclic reaction, to generate colored compounds.

The aforesaid spiropyran compounds are represented by the following Formula 1:

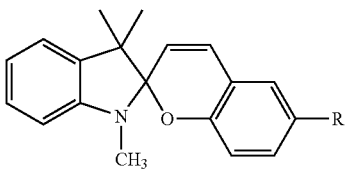

Formula 1 wherein R is hydrogen, halogen, nitro, or $C_{1-4}$ alkoxy. For example, R may be nitro or methoxy.

The aforesaid heterocyclic diarylethene compounds are represented by the following Formula 2:

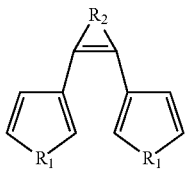

Formula 2 wherein $R_1$ is N, O, or S; and $R_2$, together with the double bond to which it attaches, forms a of a perfluorocyclopentene ring, a cyclopentene ring, a dihydrothiophene ring, a maleic anhydride ring, or a pyrroline ring. For example, $R_2$, together with the double bond to which it attaches, forms a of cyclopentene ring.

Usually, the range of colors displayed by the liquid crystal display device needed to be adjusted is very narrow. Therefore, the conditions for the used UV radiation are relatively mild. By modifying the organic additives discussed above, for example, introducing different groups at different positions, different display colors may be obtained. For example, where the aforesaid heterocyclic diarylethene compounds have different substituents, they will form compounds having a ring structure upon UV radiation, thereby displaying different colors.

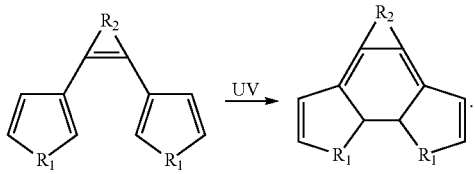

Each of the $R_1$-containing ring and the $R_2$-containing ring in the aforesaid heterocyclic diarylethene compounds may be independently substituted by substituents selected from halogen and $C_{1-4}$ alkyl. For example, the $R_1$-containing ring is substituted by methyl, and the $R_2$-containing ring is substituted by fluoro. For example, the compound may be dithiopheneperfluorocyclopentene.

The aforesaid Schiff base compounds are complexes of Schiff bases derived from condensation of salicylaldehyde and aniline with $Cu^+$. Here, the aniline may be o-amino benzoic acid, p-amino benzoic acid, and the like. For example, said Schiff base compounds are complexes of Schiff bases being a condensate of salicylaldehyde and o-amino benzoic acid and represented by the following Formula 3 with $Cu^+$:

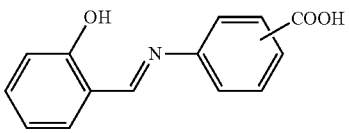

Formula 3 wherein the carboxylic group is at the ortho or para position of the C—N bond.

The aforesaid organic additive may be in an amount of 0.5-20 wt %, preferably 2-15 wt %, and more preferably 5-10 wt %, based on the total weight of the alignment material composition.

The disclosure further provides a flattening material composition, comprising 60-75 wt % of a solvent; 10-15 wt % of an adhesive; 10-15 wt % of a reactive monomer; and 0.5-20 wt % of an organic additive.

The solvent used for the flattening material composition of the invention is as described above for the alignment material composition.

The aforesaid adhesive is not particularly limited and may be common adhesives in the art, for example, usually acrylates or epoxy copolymers, and specifically, polymethyl methacrylate or an oligomer of epoxy monomers.

The aforesaid reactive monomer is not particularly limited and may be common compounds containing multiple functionalities in the molecules in the art, for example, polyisocyanates, polyamines, polyanhydrides, and the like, and specifically, hexamethylene diisocyanate, hexanediamine, and the like.

Moreover, the alignment material composition and flattening material composition may further comprise other components commonly used in the art which may be properly chosen by a person skilled in the art as required.

The processes for producing the alignment material composition and the flattening material composition are not particularly limited and may employ a common method in the art, such as mixing.

The present disclosure further provides a process for adjusting the display color of the liquid crystal display device, comprising forming an alignment layer between the array substrate and the colored film substrate of the liquid crystal display device using the aforesaid alignment material composition; or forming a flat layer above the colored film substrate using the aforesaid flattening material composition. The alignment layer and the flat layer may be formed on the array substrate and/or above the colored film substrate through a common method in the art.

The alignment material composition, the flattening material composition, and the process for adjusting the display color of the liquid crystal display device provided by the present disclosure may be directly applied in a display device with an optical alignment, without the need of adding other process steps. For a display device with rubbing alignment, a process of UV radiation will be added after the process of coating the alignment material composition or the flattening material composition.

By way of the aforesaid alignment material composition or flattening material composition, and the process for adjusting the display color of the display device, the display color can be adjusted in a large range of colors, without affecting other display performances of the liquid crystal display device.

The invention is further illustrated in combination with examples. These examples are merely illustrative, but not intended to limit the scope of the invention.

EXAMPLES

Comparative Example 1

20% of butylcellosolve and 15% of a polyimide resin were dissolved in 65% of the solvent N-methyl-2-pyrrolidone, and agitated sufficiently until the components were mixed thoroughly, generating the comparative alignment material composition I.

10% of polymethyl methacrylate as the adhesive, 15% of hexamethylene diisocyanate as the reactive monomer, and 1% of azobisisobutyronitrile as the photoinitiator were dissolved in 74% of the solvent N-methyl-2-pyrrolidone, and agitated sufficiently until the components were mixed thoroughly, generating the comparative flattening material composition I.

As shown in FIG. 1, in a conventional liquid crystal display device, using a conventional method in the art, the aforesaid comparative alignment material composition I was used to form an alignment layer 3 on the array substrate 2 and colored film substrate 6, respectively, and the aforesaid comparative flattening material composition I was used to form a flat layer 5 on the colored film substrate 6. A white light 1 emitted from a backlight source passed through the array substrate 2, the array substrate alignment film 3, the liquid crystal 4, the colored film substrate alignment film 3, the flat layer 5, and the colored film substrate 6 in order before emergence, typically resulting in a yellowish white light ray (x: 0.35, y: 0.36).

Example 1

15% of butylcellosolve and 5% of a polyimide resin were dissolved in 60% of the solvent N-methyl-2-pyrrolidone, to which 20% of a spiropyran compound of Formula 1 in which R is nitro was added as the organic additive. Then the mixture was agitated sufficiently until the components were mixed thoroughly, generating the alignment material composition I. The components used in the alignment material composition of the example were similar to the components in the comparative alignment material composition I in Comparative Example 1, except that the aforesaid organic additive was added and the levels of components were changed.

Figure 2:
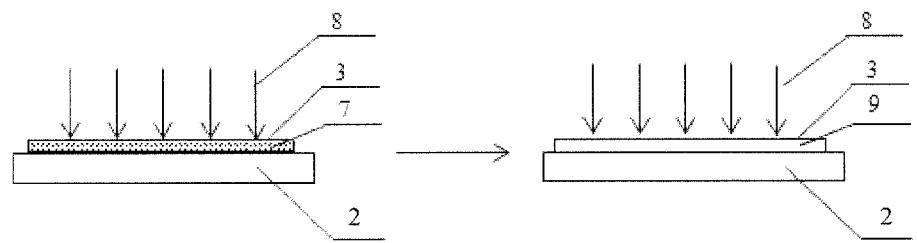
FIG. 2 is a schematic illustration showing changes in the alignment material composition in the liquid crystal display device of Example 1 of the invention.

As shown in FIG. 2, in order to rectify the yellowish display color of the Comparative Example 1, the liquid crystal display device was manufactured using a method similar to that in Comparative Example 1, except that the alignment material composition I that contains an UV-sensitive organic additive 7 (a spiropyran compound of Formula 1 in which R is nitro) was coated on the array substrate 2 and the colored film substrate 6, respectively, to form the alignment material layer 3. A 365 nm UV light 8 was then used to radiate the alignment material layer 3 for 60 s, and then the alignment material layer 3 was converted to a bluish alignment layer 3(x: 0.3, y: 0.31). This is because the spiropyran compound 7 contained in the alignment material layer 3 was subjected to a C—O bond heterolysis under UV radiation to produce a bluish cyanine compound 9.

Figure 3:
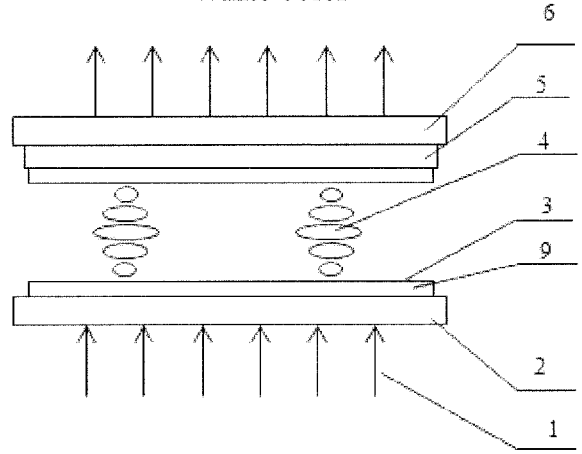
FIG. 3 is a schematic illustration showing an improved display effect of the liquid crystal display device shown in FIG. 2.

Therefore, as shown in FIG. 3, a white light 1 emitted from the backlight source passed through the array substrate 2, the bluish array substrate alignment film 3, the liquid crystal 4, the bluish colored film substrate alignment film 3, the flat layer 5 and the colored film substrate 6 in order before emergence, resulting in a normal white light ray (x: 0.33, y: 0.33).

Comparative Example 2

20% of butylcellosolve and 6% of a polyimide resin were dissolved in 74% of the solvent N-methyl-2-pyrrolidone, and agitated sufficiently until the components were mixed thoroughly, generating the comparative alignment material composition II.

10% of polymethyl methacrylate as the adhesive and 15% of hexamethylene diisocyanate as the reactive monomer, were dissolved in a mixed solvent of 40% of N-methyl-2-pyrrolidone and 35% of propylene glycol mono-methyl ether ethyl ester, and agitated sufficiently until the components were mixed thoroughly, generating the comparative flattening material composition II.

In a conventional liquid crystal display device as shown in FIG. 1, using a conventional method in the art, the aforesaid comparative alignment material composition 2 was used to form the alignment layer 3 on the array substrate 2 and colored film substrate 6, respectively, and the aforesaid comparative flattening material composition 2 was used to form the flat layer 5 on the colored film substrate 6. A white light 1 emitted from the backlight source passed through the array substrate 2, the array substrate alignment film 3, the liquid crystal 4, the colored film substrate alignment film 3, the flat layer 5 and the colored film substrate 6 in order before emergence, typically resulting in a bluish white light ray (x: 0.28, y: 0.28).

Example 2

20% of butylcellosolve and 5% of a polyimide resin were dissolved in 65% of the solvent N-methyl-2-pyrrolidone, to which 10% of a complex of a Schiff base being a condensate of salicylaldehyde and o-amino benzoic acid with $Cu^+$ was added as the organic additive. Then the mixture was agitated sufficiently until the components were mixed thoroughly, generating the alignment material composition II. The components used in the alignment material composition of the example were similar to the components in the comparative alignment material composition II in Comparative Example 2, except that the aforesaid organic additive was added and the levels of components were changed.

Figure 4:
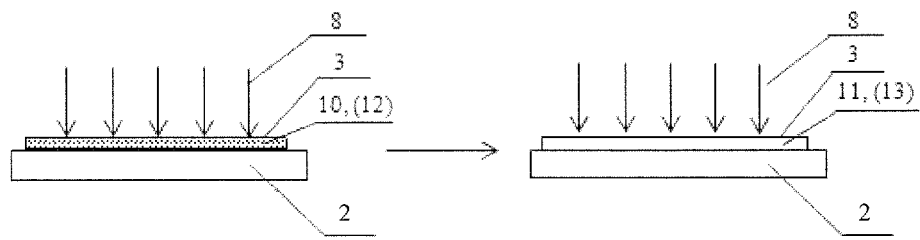
FIG. 4 is a schematic illustration showing changes in the alignment material composition in the liquid crystal display device of Example 2 or 3 of the invention.

As shown in FIG. 4, in order to rectify the bluish display color of the Comparative Example 2, the liquid crystal display device was manufactured using a method similar to that in Comparative Example 2, except that the alignment material composition II that contains an UV-sensitive organic additive 10 (a complex of Schiff base being a condensate of salicylidene and o-amino benzoic acid with $Cu^+$) was coated on the array substrate 2 and colored film substrate 6, respectively, to form the alignment material layer 3. A 365 nm UV light 8 was then used to radiate the alignment material layer 3 for 45 s, and then the alignment material layer 3 was converted to a yellowish alignment layer 3 (x: 0.37, y: 0.37). This is because the enol form complex 10 formed by a Schiff base derived from condensation of salicylaldehyde and o-amino benzoic acid with $Cu^+$ contained in the alignment material layer 3 was subjected to a cis-trans isomerization under UV radiation to produce a yellowish ketone form complex 11.

Figure 5:
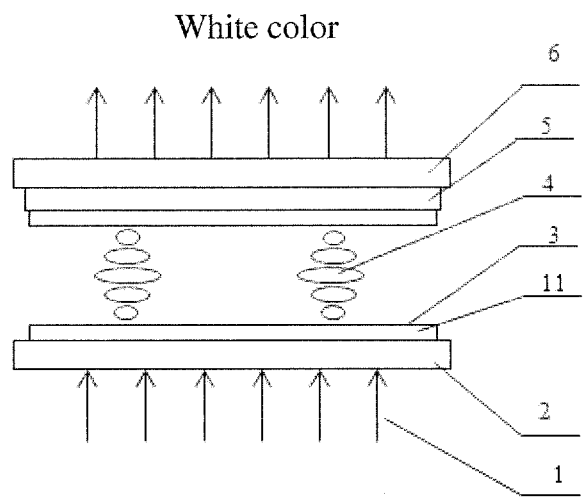
FIG. 5 is a schematic illustration showing an improved display effect of the liquid crystal display device according to Example 2 or 3 of the invention.

Therefore, as shown in FIG. 5, a white light 1 emitted from the backlight source passed through the array substrate 2, the yellowish array substrate alignment film 3, the liquid crystal 4, the yellowish colored film substrate alignment film 3, the flat layer 5, and the colored film substrate 6 in order before emergence, resulting in a normal white light ray (x: 0.33, y: 0.33).

Example 3

18% of butylcellosolve and 5% of a polyimide resin were dissolved in 65% of the solvent N-methyl-2-pyrrolidone, to which 12% of dithiophene perfluorocyclopentene was added as the organic additive. Then the mixture was agitated sufficiently until the components were mixed thoroughly, generating the alignment material composition III. The components used in the alignment material composition of the example were similar to the components in the comparative alignment material composition II in Comparative Example 2, except that the aforesaid organic additive was added and the levels of components were changed.

As shown in FIG. 4, in order to rectify the bluish display color of the Comparative Example 2, the liquid crystal display device was manufactured using a method similar to that in Comparative Example 2 except that the alignment material composition III that contains an UV-sensitive organic additive 12 (dithiophene perfluorocyclopentene) was coated on the array substrate 2 and colored film substrate 6, respectively, to form the alignment material layer 3. A 365 nm UV light 8 was then used to radiate the alignment material layer 3 for 90 s, and then the alignment material layer 3 was converted to a yellowish alignment layer 3 (x: 0.36, y: 0.37). This is because the dithiophene perfluorocyclopentene contained in the alignment material layer 3 was subjected to a pericyclic reaction under UV radiation to produce a fused ring compound 13.

Therefore, as shown in FIG. 5, a white light 1 emitted from the backlight source passed through the array substrate 2, the yellowish array substrate alignment film 3, the liquid crystal 4, the yellowish colored film substrate alignment film 3, the flat layer 5 and the colored film substrate 6 in order before emergence, resulting in a normal white light ray (x: 0.33, y: 0.33).

Example 4

10% of polymethyl methacrylate as the adhesive, 15% of hexamethylene diisocyanate as the reactive monomer, and 4.5% of a spiropyran compound of Formula 1 in which R is nitro, as the organic additive were dissolved in 70.5% of the solvent N-methyl-2-pyrrolidone. Then the mixture was agitated sufficiently until the components were mixed thoroughly, generating the flattening material composition I. The polymethyl methacrylate and hexamethylene diisocyanate used in the flattening material composition of the example were identical to those in the comparative flattening material composition II in Comparative Example 2, except that the aforesaid organic additive was added and the levels of components were changed.

Figure 6:
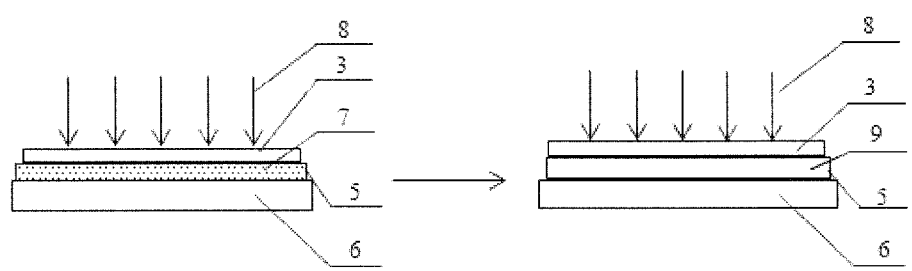
FIG. 6 a schematic illustration showing changes in the flattening material composition in the liquid crystal display device of Example 4 of the invention.

As shown in FIG. 6, in order to rectify the yellowish display color of the Comparative Example 1, the colored film substrate 6 was coated with the flattening material composition I that contains an UV-sensitive organic additive 7 (the spiropyran compound of Formula 1 in which R is nitro), to form the flattening material layer 5. A 365 nm UV light 8 was then used to radiate the flat layer 5 for 60 s, and then the flattening material layer 5 was converted to a bluish flat layer 5 (x: 0.3, y: 0.31). This is because the spiropyran compound 7 contained in the flattening material layer 5 was subjected to a C—O bond heterolysis reaction under UV radiation to produce a bluish cyanine compound 9.

Figure 7:
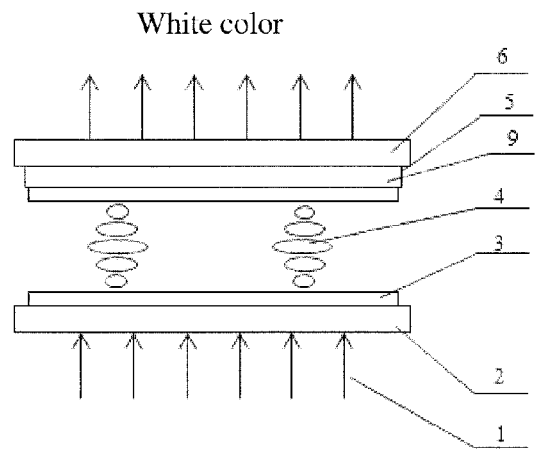
FIG. 7 is a schematic illustration showing an improved display effect of the liquid crystal display device shown in FIG. 6.

Therefore, as shown in FIG. 7, a white light 1 emitted from the backlight source passed through the array substrate 2, the array substrate alignment film 3, the liquid crystal 4, the colored film substrate alignment film 3, the bluish flat layer 5 and the colored film substrate 6 in order before emergence, resulting in a normal white light ray (x: 0.33, y: 0.33).

Example 5

10% of polymethyl methacrylate as the adhesive, 15% of hexamethylene diisocyanate as the reactive monomer, and 1.5% of a complex of a Schiff base being a condensate of salicylaldehyde and o-amino benzoic acid with $Cu^+$, as the organic additive were dissolved in 73.5% the solvent N-methyl-2-pyrrolidone. Then the mixture was agitated sufficiently until the components were mixed thoroughly, generating the flattening material composition II. The polymethyl methacrylate and hexamethylene diisocyanate used in the flattening material composition of the example were identical to those in the comparative flattening material composition II in Comparative Example 2, except that the aforesaid organic additive was added and the levels of components were changed.

Figure 8:
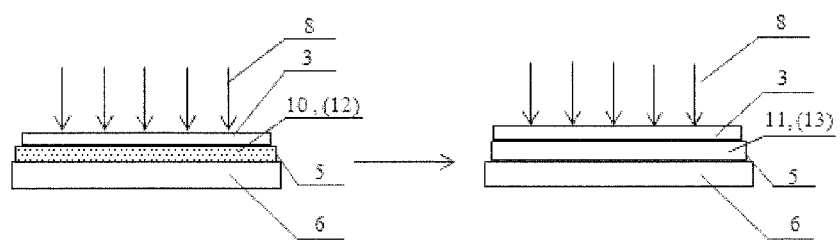
FIG. 8 is a schematic illustration showing changes in the flattening material composition in the liquid crystal display device of Example 5 or 6 of the invention.

As shown in FIG. 8, in order to rectify the bluish display color of the Comparative Example 2, the colored film substrate 6 was coated with the flattening material composition II that contains an UV-sensitive organic additive 10 (a complex of a Schiff base being a condensate of salicylaldehyde and o-amino benzoic acid with $Cu^+$), to form the flattening material layer 5. A 365 nm UV light 8 was then used to radiate the flat layer 5 for 45 s, and then the flattening material layer 5 was converted to a yellowish flat layer 5 (x: 0.37, y: 0.37). This is because the enol form complex 10 formed by a condensed salicylaldehyde-o-amino benzoic acid Schiff base with Cu+ contained in the flattening material layer 5 was subjected to a cis-trans isomerization under UV radiation to produce a yellowish ketone form complex 11.

Figure 9:
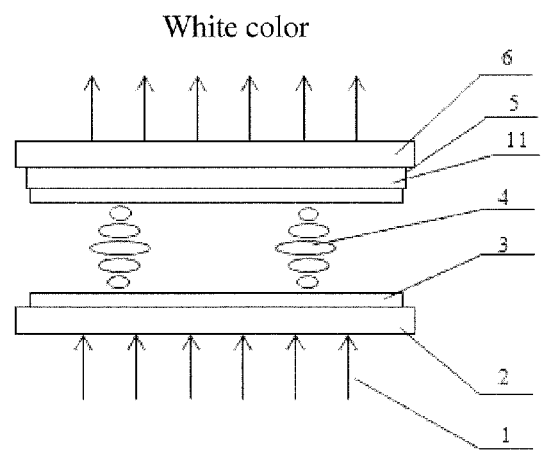
FIG. 9 is a schematic illustration showing an improved display effect of the liquid crystal display device shown in FIG. 8.

Therefore, as shown in FIG. 9, the white light 1 emitted from the backlight source passed through the array substrate 2, the array substrate alignment film 3, the liquid crystal 4, the colored film substrate alignment film 3, the yellowish flat layer 5 and the colored film substrate 6 in order before emergence, resulting in a normal white light ray (x: 0.33, y: 0.33).

Example 6

10% of polymethyl methacrylate as the adhesive, 15% of hexamethylene diisocyanate as the reactive monomer, and 0.5% of dithiophene perfluorocyclopentene as the organic additive were dissolved in 74.5% the solvent N-methyl-2-pyrrolidone. Then the mixture was agitated sufficiently until the components were mixed thoroughly, generating the flattening material composition III. The polymethyl methacrylate and hexamethylene diisocyanate used in the flattening material composition of the example were identical to those in the comparative flattening material composition II in Comparative Example 2, except that the aforesaid organic additive was added and the levels of components were changed.

As shown in FIG. 8, in order to rectify the bluish display color of the Comparative Example 2, the colored film substrate 6 was coated with the flattening material composition III that contains an UV-sensitive organic additive 12 (dithiophene perfluorocyclopentene), to form the flattening material layer 5. A 365 nm UV light 8 was then used to radiate the flat layer 5 for 90 s, and then the flattening material layer 5 was converted to a yellowish flat layer 5 (x: 0.36, y: 0.37). This is because the dithiophene perfluorocyclopentene contained in the flattening material layer 5 was subjected to a pericyclic reaction under UV radiation to produce a fused ring compound 13.

Therefore, as shown in FIG. 9, a white light 1 emitted from the backlight source passed through the array substrate 2, the array substrate alignment film 3, the liquid crystal 4, the colored film substrate alignment film 3, the yellowish flat layer 5 and the colored film substrate 6 in order before emergence, resulting in a normal white light ray (x: 0.33, y: 0.33).

From the aforesaid examples and comparative examples, it can be seen that by forming an alignment layer or a flat layer having certain color from the alignment material composition or the flattening material composition of the invention that contains an organic additive sensitive to UV light, the display color of the liquid crystal display device may be adjusted to improve the display effect of the liquid crystal display device, without affecting other display performances.

Although the invention is described above in details using general illustration, specific embodiments and experiments, it is obvious to a person skilled in the art to make modifications or improvement on the basis of the invention. Therefore, all these modifications or improvements made without departing from the spirits of the invention will fall into the scope of the invention.

The invention claimed is:

1. An alignment material composition comprising,
60-65 wt % of a solvent;
10-30 wt % of a butylcellosolve;
0.5-20 wt % of an organic additive; and
5-10 wt % of a polyimide resin;
wherein the organic additive is Schiff base compounds, which are complexes of Schiff bases derived from condensation of salicylaldehyde and aniline and represented by the following formula 3 with $Cu^+$:

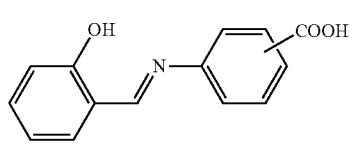

Formula 3 wherein the carboxylic group is at the ortho or para position of the C—N bond.

2. A liquid crystal display device comprising an alignment layer formed from the alignment material composition according to claim 1.

3. A process for adjusting the display color of a liquid crystal display device comprising:
forming an alignment layer from the alignment material composition according to claim 1 between an array substrate and a colored film substrate of the liquid crystal display device.

4. The process for adjusting the display color of the liquid crystal display device according to claim 3, wherein the alignment layer is subjected to UV light radiation to allow the organic additive to display color.

5. The process for adjusting the display color of the liquid crystal display device according to claim 3, wherein the alignment layer is subjected to UV light radiation before or after rubbing alignment of the alignment layer.

* * * * *